United States Patent [19]

Sharbaugh

[11] Patent Number: 4,681,731
[45] Date of Patent: Jul. 21, 1987

[54] NUCLEAR REACTOR CONSTRUCTION WITH BOTTOM SUPPORTED REACTOR VESSEL

[75] Inventor: John E. Sharbaugh, Bullskin Township, Fayette County, Pa.

[73] Assignee: The United States of America as represented by the United States Department of Energy, Washington, D.C.

[21] Appl. No.: 795,592

[22] Filed: Nov. 6, 1985

[51] Int. Cl.4 .............................................. G21C 9/00
[52] U.S. Cl. .................................. 376/285; 376/294; 376/404; 376/461
[58] Field of Search ............... 376/285, 294, 402, 403, 376/404, 405, 461

[56] References Cited

U.S. PATENT DOCUMENTS

| | | |
|---|---|---|
| 2,810,689 | 10/1957 | Wigner et al. . |
| 2,841,545 | 7/1958 | Zinn . |
| 2,961,393 | 11/1960 | Monson . |
| 2,990,355 | 6/1961 | Nordheim et al. . |
| 3,007,859 | 11/1961 | Stoops et al. . |
| 3,021,273 | 2/1962 | Dix ..................................... 376/273 |
| 3,070,533 | 12/1962 | Arms et al. ......................... 376/294 |
| 3,072,549 | 1/1963 | Koutz et al. . |
| 3,120,471 | 2/1964 | Koutz et al. . |
| 3,257,285 | 6/1966 | Clifford et al. . |
| 3,303,098 | 2/1967 | Lagowski . |
| 3,393,127 | 7/1968 | Detman et al. . |
| 4,094,737 | 6/1978 | Greischel et al. . |
| 4,313,795 | 2/1982 | Dauvergne . |
| 4,581,199 | 4/1986 | Bioret et al. ......................... 376/285 |

OTHER PUBLICATIONS

Costes, "A Cold-Bottom Supported Vessel for Sodium-Cooled Reactors", Nuclear Technology, vol. 67, Oct. 84, pp. 169-176.
Winkleblack, "Competitive Breeder Power Plants," Aug. 1984, pp. 1-61.

Primary Examiner—Deborah L. Kyle
Assistant Examiner—Richard W. Wendtland
Attorney, Agent, or Firm—F. J. Baehr, Jr.

[57] ABSTRACT

An improved liquid metal nuclear reactor construction has a reactor core and a generally cylindrical reactor vessel for holding a large pool of low pressure liquid metal coolant and housing the core within the pool. The reactor vessel has an open top end, a closed flat bottom end wall and a continuous cylindrical closed side wall interconnecting the top end and bottom end wall. The reactor also has a generally cylindrical concrete containment structure surrounding the reactor vessel and being formed by a cylindrical side wall spaced outwardly from the reactor vessel side wall and a flat base mat spaced below the reactor vessel bottom end wall. A central support pedestal is anchored to the containment structure base mat and extends upwardly therefrom to the reactor vessel and upwardly therefrom to the reactor core so as to support the bottom end wall of the reactor vessel and the lower end of the reactor core in spaced apart relationship above the containment structure base mat. Also, an annular reinforced support structure is disposed in the reactor vessel on the bottom end wall thereof and extends about the lower end of the core so as to support the periphery thereof. In addition, an annular support ring having a plurality of inward radially extending linear members is disposed between the containment structure base mat and the bottom end of the reactor vessel wall and is connected to and supports the reactor vessel at its bottom end on the containment structure base mat so as to allow the reactor vessel to expand radially but substantially prevent any lateral motions that might be imposed by the occurrence of a seismic event. The reactor construction also includes a bed of insulating material in sand-like granular form, preferably being high density magnesium oxide particles, disposed between the containment structure base mat and the bottom end wall of the reactor vessel and uniformly supporting the reactor vessel at its bottom end wall on the containment structure base mat so as to insulate the reactor vessel bottom end wall from the containment structure base mat and allow the reactor vessel bottom end wall to freely expand as it heats up while providing continuous support thereof. Further, a deck is supported upon the side wall of the containment structure above the top open end of the reactor vessel, and a plurality of serially connected extendible and retractable annular bellows extend between the deck and the top open end of the reactor vessel and flexibly and sealably interconnect the reactor vessel at its top end to the deck. An annular guide ring is disposed on the containment structure and extends between its side wall and the top open end of the reactor vessel for providing lateral support of the reactor vessel top open end by limiting imposition of lateral loads on the annular bellows by the occurrence of a lateral seismic event.

16 Claims, 4 Drawing Figures

NUCLEAR REACTOR CONSTRUCTION WITH BOTTOM SUPPORTED REACTOR VESSEL

CROSS REFERENCE TO RELATED APPLICATION

Reference is hereby made to the following copending U.S. patent application dealing with related subject matter and assigned to the assignee of the present invention: "An Improved Nuclear Reactor Plant Construction" by Frank G. Gallo et al, assigned U.S. Ser. No. 602,232 and filed Apr. 19, 1984.

BACKGROUND OF THE INVENTION

1. Field of the Invention

The present invention relates generally to nuclear reactors and, more particularly, is concerned with an improved nuclear reactor in which the reactor vessel is uniformly supported at its bottom above the reactor containment base mat in a manner which allows the vessel to expand radially, but prevents any lateral motions that might be imposed by a seismic event.

2. Description of the Prior Art

A liquid metal-cooled nuclear reactor (LMR), like other reactors, produces heat by fissioning of nuclear materials which are fabricated into fuel elements and assembled within a nuclear reactor core situated in a reactor vessel. The heat produced by the LMR is used to generate electricity. A typical energy conversion process for the LMR, being similar to that of most commercial nuclear reactors, involves transfer of heat from the reactor core to a primary coolant flow system, therefrom to a secondary coolant flow system and finally into steam from which electricity is generated.

In the LMR, a reactor coolant, such as liquid sodium, is circulated through the primary coolant flow system. A typical primary coolant flow system comprises the reactor core, a heat exchanger and a circulation pump. In a "pool" type system, the nuclear reactor core, the heat exchanger and the circulation pump are located within a large pool of coolant housed within a single vessel, whereas, in a "loop" type system, the heat exchanger and circulation pump are removed from the vessel housing the reactor core and relocated normally in separate vessels.

Generally, there are several heat exchangers and circulation pumps associated with the reactor core. The heat generated by the core is removed by the reactor coolant which flows into the core supporting structure and through the reactor core. The heated reactor coolant then flows through the heat exchangers which transfer the heat to secondary flow systems associated therewith. The cooled coolant exits from the heat exchangers and flows to a circulation pump which again circulates the coolant to the core supporting structure, repeating the described flow cycle.

Although liquid sodium has excellent heat transfer properties and low vapor pressure at temperatures of interest for power generation, and is abundant, commercially available in acceptable purity and relatively inexpensive, making it an attractive medium as a reactor coolant, it does react violently with water which imposes severe problems in the design of sodium-to-water steam boilers. Therefore, reactor safety is a foremost design requirement. Due to the aforementioned characteristics of the liquid metal coolant, sodium, the design must guard against the unlikely happening of loss of coolant around the reactor core. Coolant loss could result from the rupture of the reactor vessel or in the core of a loop type system, rupture of one of the main coolant circulating lines.

Traditionally, most reactor vessels in LMRs are designed to be supported from the top of the vessel. The deck or vessel flange can be cooled, or a support can be provided which allows the vessel support and the reactor foundation to be near the same temperature, so that differential thermal expansions do not occur at the point where the reactor is anchored. Typical examples are the French Phoenix and Super Phoenix designs, and the U.S. FFTF and CRBR designs. These top-supported vessels, being suspended by their shell from the roof or top deck of the reactor, disadvantageously react to seismic loads like pendulums and develop high stresses in the shell near the top of the vessel. Furthermore, they amplify the loads applied to the reactor core within the vessel. This requires more structural material in the core to withstand the loads, resulting in a loss of neutron efficiency. Also, the reactor vessel, being suspended in place, is free to thermally expand downward, away from the support level. This latter characteristic is undesirable for certain accident scenarios in that as the vessel shell heats up, it expands downward moving the core away from the control elements associated therewith, thus leading to an unwanted increase in reactivity.

Over the years, there have also been nuclear reactor designs in which the reactor vessels are bottom supported. Representative of the prior patent art are the bottom supported reactor designs disclosed in U.S. Patents to Wigner et al (U.S. Pat. No. 2,810,689), Zinn (U.S. Pat. No. 2,841,545), Monson (U.S. Pat. No. 2,961,393), Nordheim et al (U.S. Pat. No. 2,990,355), Stoops et al (U.S. Pat. No. 3,007,859), Koutz et al (U.S. Pat. No. 3,072,549 and U.S. Pat. No. 3,120,471), Clifford et al (U.S. Pat. No. 3,257,285), Lagowski (U.S. Pat. No. 3,303,098), Detman et al (U.S. Pat. No. 3,393,127), Greischel et al (U.S. Pat. No. 4,094,737) and Dauvergne (U.S. Pat. No. 4,313,795).

Also, representative of the prior literature art are the bottom supported reactor designs disclosed in an article entitled "A Cold-Bottom Supported Vessel For Sodium-Cooled Reactors" by Didier Costes, in *Nuclear Technology*, Vol. 67, October 1984, pages 169–176. The Costes article illustrates and describes a variety of bottom supported reactor vessel designs and discusses the possible advantages thereof. The article then proposes a bottom supported vessel design which includes a bottom plate resting on an installation basemat by means of radially flexible supports and a horizontal thin upper flange described as a single-plane bellow extending outside of the upper hoop of the vessel shell and externally clamped to the periphery of the roof deck or slab.

Notwithstanding the potential for some of the bottom supported reactor vessel designs of the abovecited references to overcome many of the pitfalls inherent in prior top suspended reactor vessel designs, it is perceived that a need still remains for an alternative approach to supporting a reactor vessel by its bottom which will substantially overcome the problems experienced with top suspended vessels without creating any significant new ones.

SUMMARY OF THE INVENTION

The present invention provides an improved nuclear reactor construction with a bottom supported vessel support system designed to satisfy the aforementioned needs. The improved reactor construction of the present invention achieves the potential advantages envisioned for a bottom supported reactor vessel by providing better resistance to seismic loads, greater integrity for the reactor vessel, and a more inherently safe reactor due to the fact that thermal expansion of the control elements and the core will result in an inherent decrease in reactivity.

Accordingly, the present invention is directed to an improved liquid metal nuclear reactor construction which comprises: (a) a nuclear reactor core having a bottom platform support structure; (b) a reactor vessel for holding a large pool of unpressurized liquid metal coolant and housing the core within the pool, the vessel having an open top end, a closed bottom end wall and a continuous closed side wall extending upward from the bottom end wall; (c) a containment structure surrounding the reactor vessel and having a side wall spaced outwardly from the reactor vessel side wall and having a base mat spaced below the reactor vessel bottom end wall; (d) a central support member anchored to the containment structure base mat and extending upwardly therefrom so as to support the bottom end wall of the reactor vessel and the lower end of the reactor core in spaced apart relationship above the containment vessel base mat; (e) a platform support structure disposed in the reactor vessel on the bottom end wall thereof and extending about the lower end of the core so as to support the core; (f) structural support means disposed between the containment structure base mat and the bottom end wall of the reactor vessel and supporting the reactor vessel at its bottom end wall on the containment structure base mat so as to allow the reactor vessel to expand radially but substantially prevent any lateral motions that might be imposed by the occurrence of a seismic event; (g) a bed of insulating material disposed between the containment structure base mat and the bottom end wall of the reactor vessel and uniformly supporting the reactor vessel at its bottom end wall on the containment structure base mat so as to insulate the reactor vessel bottom end wall from the containment structure base mat and allow the reactor vessel bottom end wall to freely expand as it heats up while providing continuous support thereof; (h) a deck supported upon the side wall of the containment structure above the top open end of the reactor vessel; and (i) extendible and retractible coupling means extending between the deck and the top open end of the reactor vessel and flexibly and sealably interconnecting the reactor vessel at its top end to the deck.

More particularly, the structural support means includes an annular support ring having a plurality of inward radially extending linear members being disposed between the containment structure base mat and the bottom end wall of the reactor vessel and connected to and supporting the reactor vessel at its bottom end wall on the containment structure base mat. The bed of insulating material is in sand-like granular form and preferably is high density magnesium oxide particles. The coupling means includes a plurality of serially connected extendible and retractible annular bellows.

Further, the improved reactor construction also comprises an annular guide ring with radial keys and keyways disposed on the containment structure and extending between its side wall and the top end of the reactor vessel for providing lateral support of the reactor vessel top end for limiting imposition of lateral loads on the coupling means by the occurrence of a lateral seismic event. Also, included is a guard wall disposed between the reactor and containment structure side walls, with the guard wall surrounding and spaced outwardly from the reactor vessel side wall and being connected at its lower end to the annular support ring adjacent to the vessel bottom end wall. Additionally, the reactor construction comprises a bottom liner disposed between the base mat of the containment structure and the bottom end wall of the reactor vessel and below the bed of insulating material. Finally, the reactor construction has cooling means disposed in the base mat of the containment structure for removing heat from the containment structure and the bed of insulating material. The cooling means is in the form of a plurality of radial cooling pipes embedded in the base mat of the containment structure and underlying the bed of insulating material.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
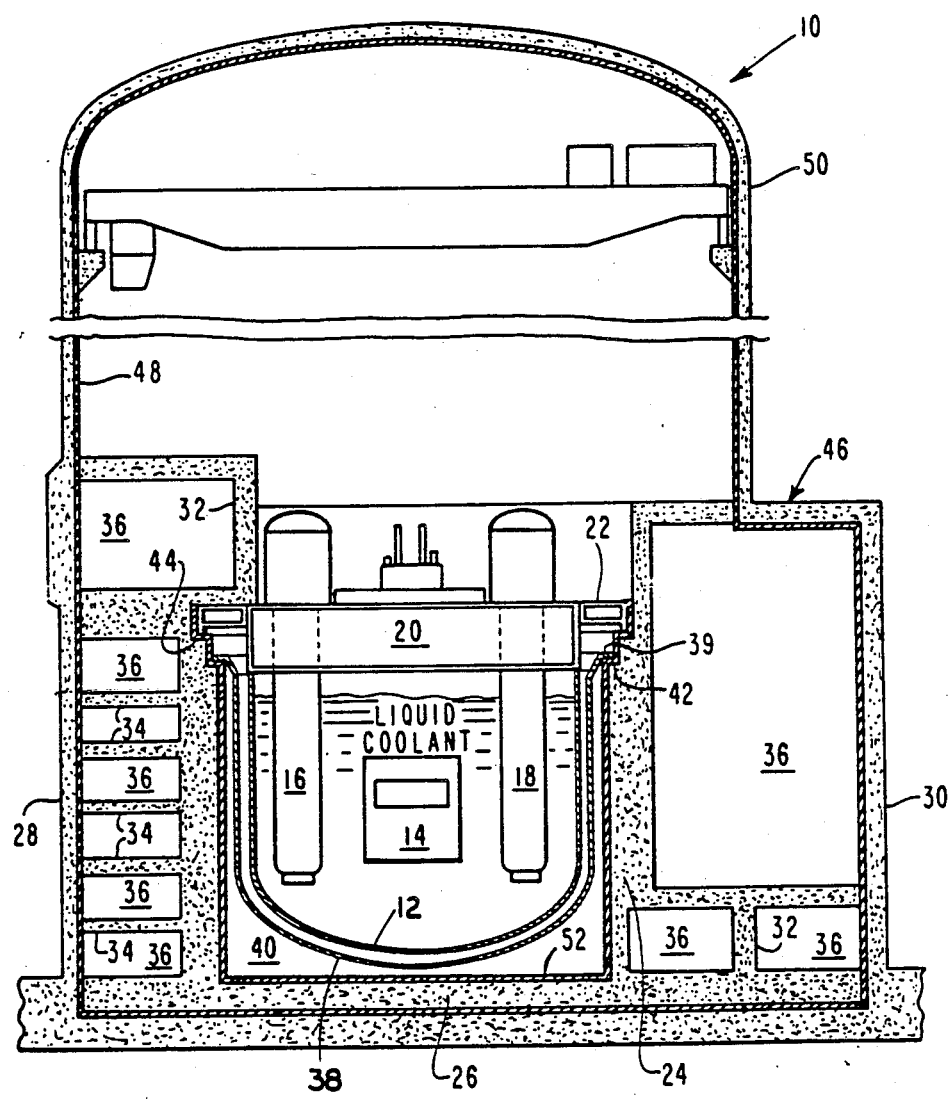
FIG. 1 is a simplified schematical vertical cross-sectional view of a conventional pool type LMR having a top suspended reactor vessel.

In the following description, like reference characters designate like or corresponding parts throughout the several views. Also in the following description, it is to be understood that such terms as "forward", "rearward", "left", "right", "upwardly", "downwardly" and the like, are words of convenience and are not to be construed as limiting terms.

Prior art LMR with Top Suspended Reactor Vessel

For a clearer and better understanding of the present invention, it is thought that it would be helpful to provide a brief description of the prior art liquid metal cooled nuclear reactor (LMR), generally identified by the numeral 10, having a top suspended reactor vessel 12. Toward this end, FIG. 1 of the drawings schematically illustrates the conventional plant construction of a typical LMR 10. The LMR 10 is of the type fully described in the EPRI report number NP-1016-SY, Project 620-26,27 dated March 1979 and entitled "Large Pool LMFBR Design, Executive Summary". Since the plant is an exceedingly complex structure, as can be appreciated by those skilled in the art of reactors, only a simplified version of the main components of the prior art plant, which are generally relevant to the improved support system of the present invention, are shown in FIG. 1.

The LMR 10 is of the "pool" type which basically includes a cylindrical reactor vessel 12 which holds a large pool of coolant, such as liquid sodium, and houses a reactor core 14, a circulation pump 16 and a heat exchanger 18. The reactor vessel 12 has an open top end and is supported in suspended fashion at its top end from a transverse deck 20 which, in turn, is supported on its outer ring girder 22 by a reinforced concrete cylindrical side wall 24 that extends upwardly from a concrete base mat 26. Also supported on the base mat 26 are outer cylindrical vertical walls 28,30 and intermediate walls 32 that are intertied by various horizontal walls 34 to the side wall 24 in a honeycomb fashion to define a plurality of individual rooms or cells 36 for housing various equipment associated with the reactor.

The LMR 10 also includes a guard tank 38 which surrounds the reactor vessel 12. While the sodium-filled reactor vessel 12 is suspended within the guard tank 38, the vessel 12 and tank 38 are spaced apart and supported independently of one another. On the one hand, the vessel 12 is attached at its open top end in any suitable manner, such as by a full penetration bimetallic weld, directly to the bottom of the deck 20. The deck 20 thus provides a seal or enclosure for the reactor vessel 12 for containment of reactor coolant, cover gas, fuel and other radioactive materials. On the other hand, the guard tank 38 is an open tank and has an upper flange 39 by which it is suspended in a reactor cavity 40 defined by the cylindrical concrete side wall 24, from a lower annular recessed ledge 42 formed in an upper portion of the cylindrical side wall 24. The tank flange 39 is bolted to the support ledge 42 so as to withstand vertical seismic loads. The guard tank 38 serves as a catch basin for reactor primary sodium that might escape from the reactor vessel 12 under faulted conditions. It also serves to insulate the heat generated by the reactor core 14 from the reactor cavity side wall 24 and base mat 26. The space between the reactor vessel 12 and the guard tank 38 is filled with nitrogen gas.

Thus, while the reactor vessel 12 is attached directly to the deck 20, the guard tank 38 is not attached to the deck 20 at all. As seen in FIG. 1, the upper flange 39 is spaced outwardly from the perimeter of the deck 20 and below its outer ring girder 22 where the deck 20 is supported on an upper annular recessed ledge 44 also formed in the upper portion of the cylindrical side wall 24. Therefore, although the reactor vessel 12 and deck 20 provide a primary boundary or barrier between the contents of the reactor vessel 12 and the external atmosphere, the guard tank 38 in reality does not provide a true secondary boundary or barrier between the reactor vessel 12 and exterior atmosphere. Any sodium leaking into the tank 38 from the reactor vessel 12 could eventually contact and escape through the joint between the concrete side wall 24 and outer girder ring 22 of the deck 20 or the ledge 39 of the tank 38.

Since regulatory requirements for nuclear reactors make the provision of a double boundary or barrier about the reactor mandatory, the concrete containment building 46 of the conventional LMR 10 which houses all of the above-mentioned parts includes an outer steel liner 48 which encompasses all of the parts. The liner 48 is exaggerated in cross-sectional thickness in FIG. 1 for purposes of illustration. Also, it should be understood that, while not shown in FIG. 1, in the upper dome 50 of the containment building 46, the liner 48 is spaced from the interior wall of the concrete structure of the building 46. Additionally, an inner steel liner 52 is provided adjacent the concrete side wall 24 and base mat 26 of the reactor cavity. While the liner 52 is also illustrated directly contacting the interior surfaces of the side wall 24 and base mat 26, it should be understood that a small gap is present between the liner on the one side and the wall and base mat on the other. The respective gaps between liner 48 and dome 50 and between liner 52 and wall/base mat 24,26 serve to impede the transfer of heat from within the dome 50 to the concrete structure of the building 46 and from within the reactor cavity 40 to the concrete base mat 26 and side wall 24.

The problems associated with the top suspended reactor vessel 12 have been described supra in the background section of the application and need not be repeated here. Suffice it to say that the vessel 12 will react to seismic loads like a pendulum and develop high stresses therein near the top open end thereof.

Improved LMR with Bottom Supported Reactor Vessel

Figure 2:
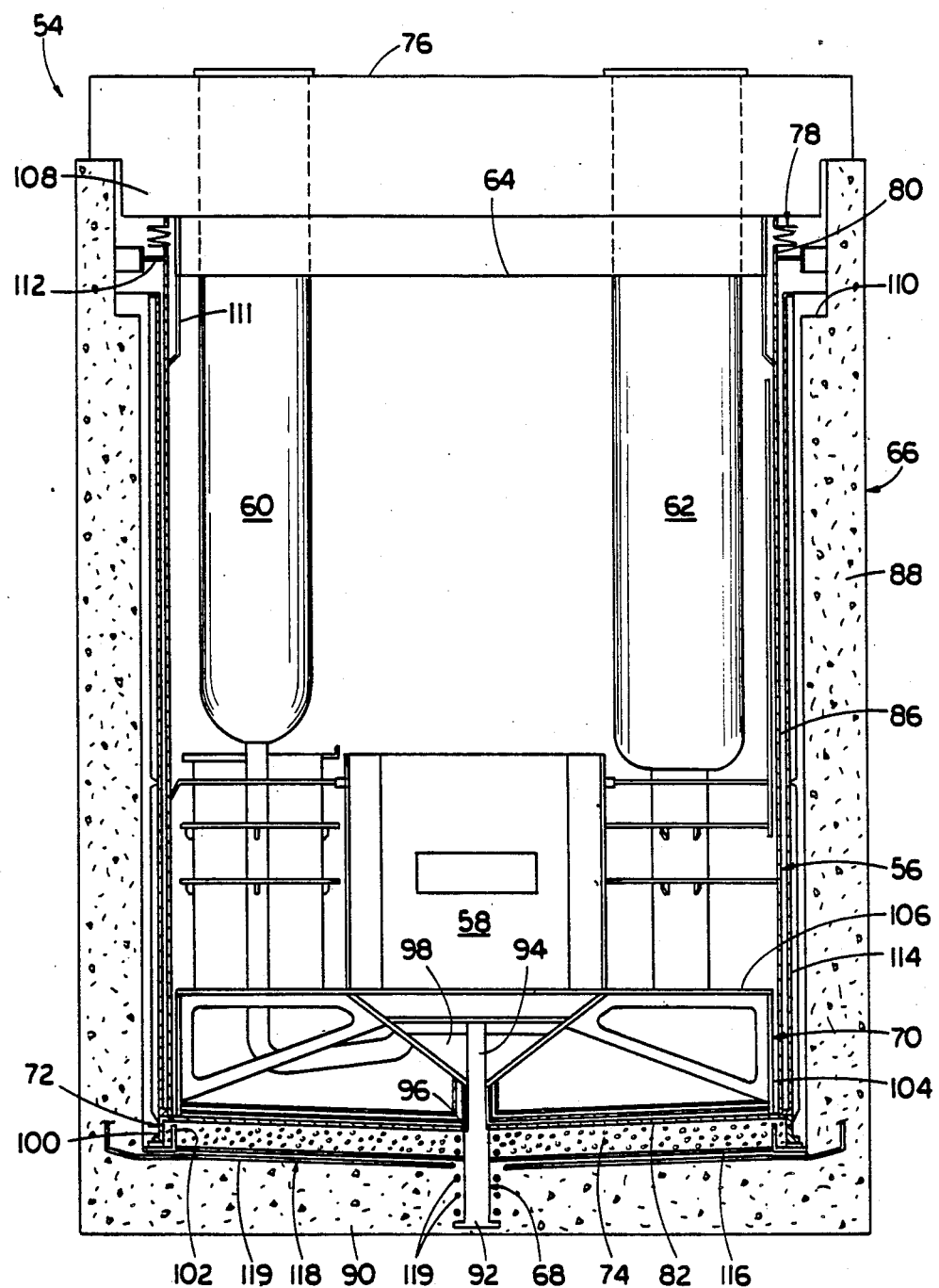
FIG. 2 is a vertical cross-sectional view of an improved LMR construction employing the principles of the present invention for supporting the reactor vessel at the bottom thereof.

Turning now to FIG. 2, there is shown the preferred embodiment of the improved LMR of the present invention, generally designated 54, incorporated a bottom supported reactor vessel 56. The improved LMR 54 per se includes generally some of the same basic components as found in the prior art LMR 10 of FIG. 1, for example, a nuclear reactor core 58, one or more circulation pumps 60 and one or more heat exchangers 62. Also similar per se in function to the prior art LMR 10, the improved LMR 54 includes the reactor vessel 56 for holding the large pool 64 of low pressure liquid coolant, for instance liquid sodium, and for housing the reactor core 58 in the coolant pool 64. In the preferred embodiment, the circulation pump 60 and heat exchanger 62 also extend into the coolant pool 64. While the improved LMR 54 of the present invention is shown in the form of a pool-type reactor, the principles of the present invention are readily adaptable for employment in a loop-type reactor.

The improved LMR 54 basically includes the nuclear reactor core 58, the generally cylindrical reactor vessel 56, a generally cylindrical concrete containment structure 66, a core central support pedestal 68, a core annular support structure 70, a reactor vessel bottom structural support means 72, a bed of insulating material 74, a top deck 76 and a serially connected series of bellows 78. As mentioned, the reactor vessel 56 holds a large pool 64 of low pressure liquid metal coolant, such as liquid sodium, and houses the core within the pool. The reactor vessel 56 has an open top end 80, a closed flat bottom end wall 82 and a continuous cylindrical closed side wall 86 interconnecting the top end 80 and the bottom end wall 82. The concrete containment structure 66 defines a cavity in which the reactor vessel 56 is inserted such that containment structure 66 surrounds the reactor vessel 56 and is generally spaced in concentric relationship. Particularly, the containment structure 66 has a cylindrical side wall 88 spaced outwardly from the reactor vessel side wall 86 and a flat base mat 90 spaced below the reactor vessel bottom end wall 82 and peripherally merged with the containment structure side wall 88. For neutralizing any leakage of liquid coolant from the reactor vessel 56 into the containment structure 66, an inert gas, such as nitrogen, is contained within the space between the two. The vessel and structure 56,55 respectively provide the primary and secondary barriers between the coolant 64 and the exterior atmosphere.

The reactor vessel 56 is supported at its bottom end wall 82 upon the base mat 90 of the containment structure 66 by the central support pedestal 68, the structural support means 72 and the insulating material bed 74. In one embodiment, the pedestal 68 is anchored to the containment structure base mat 90 by being buried therein and extends upwardly therefrom. A lower portion 92 of the pedestal 68 being disposed below the reactor vessel bottom end wall 82 has a larger cross-sectional size than that of an upper portion 94 thereof which extends upwardly above the end wall 82. An upwardly-facing annular shoulder 96 is formed on the pedestal 68 at the transition between the lower and upper pedestal portions 92,94 and supports the vessel bottom end wall 82 at the central region thereof. The upper pedestal portion 94 also extends upwardly therefrom through the core inlet plenum 98 to the core 58 so as to support the core at a lower end thereof in spaced apart relationship above the reactor vessel bottom end wall 82.

The structural support means 72 includes an annular support ring 100 having a plurality of inward radially extending linear members 102. The support ring and members 100,102 are disposed between the containment structure base mat 90 and the cylindrical wall 86 of the reactor vessel 56. The ring 100 is also connected to the reactor vessel 56 at its bottom end wall 82 so as to support and transmit the weight of the vessel 56 and its contents down to the containment structure base mat 90. The combined configuration of the ring and radial members 100, 102 allows the reactor vessel to expand radially but substantially prevents any lateral motions that might be imposed on it by the occurrence of a seismic event.

The bed 74 of insulating material which supports the bottom end wall 82 of the reactor vessel 56 is in sand-like granular form, preferably composed of high density magnesium oxide particles or beads. The bed 74 is disposed and distributed between the containment structure base mat 90 and the reactor vessel bottom end wall 82 so as to uniformly support the bottom end wall and the weight of the liquid sodium coolant in the vessel 56 on the base mat. The bed 74 is preferably about twenty inches deep and it insulates the reactor vessel bottom end wall 82 from the containment structure base mat 90. The granular nature of the bed 74 allows the reactor vessel bottom end wall 82 to freely expand as it heats up, while providing continuous support thereof. The high density magnesium oxide beads are compatible with sodium if it should leak. The beads are a proven high temperature insulation material, and will easily shear at the interface with the vessel bottom end wall 82 to accommodate the radial thermal expansion.

The reactor core 58 is also supported in the reactor vessel 56 by the annular reinforced support structure 70. The support structure 70 takes the form of a cylindrical skirt 104 and an annular platform 106, being located outboard of the core inlet plenum 98, which are disposed in the reactor vessel 56 on its bottom end wall 82 and extend about the lower end of the core 58 so as to support not only the core at its periphery, but also any other internal structures, such as the circulation pump 60 and the heat exchanger 62. The support structure 70 also has a system of radial keys and keyways which engage the reactor vessel wall 86 to center the core 58 and support structure 70 concentrically in the reactor vessel 56. These keys and keyways allow the support structure to freely expand in a radial and axial direction with respect to the reactor vessel 56; and they transmit the seismic loads imposed on the core 58 to the vessel 56, and thence to the containment structure base mat 90.

At the upper end of the improved LMR 54 is positioned the top deck 76. The deck 76 is supported upon a top edge of the containment structure side wall 88 and extends at a reduced diameter lower portion 108 into the side wall 88 above an annular recessed shoulder 110 spaced below the upper end of the containment side wall 88. The top deck 76 is spaced a short distance above the top open end 80 of the reactor vessel. In such manner, the deck 76 is independently supported from the containment structure 66, and carries the weights of the circulation pump 60 and heat exchanger 62 which extend through the deck.

Figure 3:
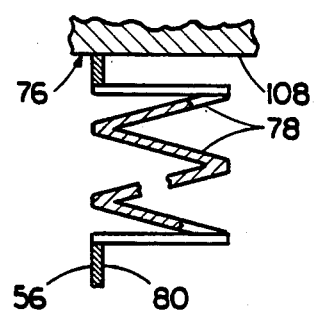
FIG. 3 is a fragmentary enlarged cross-sectional view of the upper annular bellows of the improved reactor construction which flexibly and sealably couples the top of the reactor vessel to the top deck of the reactor.

The primary barrier of the LMR 54 formed by the reactor vessel 56 is maintained continuous between the top end 80 of the reactor vessel 56 and the top deck 76 and thermal growth of the reactor vessel side wall 86 is accommodated by the use of coupling means in the form of the plurality of serially connected extendible and retractable annular bellows 78, as seen in cross-section in FIG. 3. The annular bellows 78 extend between the deck 76 and the top end 80 of the reactor vessel 56 so as to flexibly and sealably interconnect them together. When the reactor is constructed, the bellows 78 are extended to a predetermined length which develops acceptable stresses. As the reactor is heated to operating temperature, the vessel wall 86 expands upward closing the bellows and relaxing the initial stresses. Thus, at normal operating conditions of the LMR 54, the bellows 78 are essentially unstressed. As an example, the bellows 78 can be a series of twelve rings each ten inches wide and 0.05 inch thick, stacked together. As seen in FIG. 3, alternate rings are welded to the rings above them at the inside diameter of the stack, and to the rings below them at the outside diameter of the stack. It is proposed that when the vessel 56 is constructed, the rings will be stretched to a deflection of four inches at ambient room temperature. Then, as the vessel reaches normal operating temperature, the rings will be compressed, relaxing the initial stresses. Throughout their lifetime, the rings will experience a very low level of bending stress and will be limited to the differences in vessel expansion incurred by cooling down to refueling temperature. Since an annular sodium shield 111 is used to contain the hot sodium pool 64, the variation in vessel side wall temperature can be controlled more easily than if the wall were in contact with the hot sodium. The rings 78 are located in a relatively cold zone and are expected to have a maximum operating temperature of less than 300 degrees F. They are not subject to contact with the sodium and are accessable and can be continuously monitored for leakage of cover gas. Although they may be up to seventy feet in diameter, fabrication of the individual bellows rings 78 would be similar to a stiffening ring or flange for a vessel of this size.

The occurrence of any lateral seismic event could cause the top end 80 of the reactor vessel 56 to move, thus imposing a shear load on the annular bellows 78. Therefore, an annular guide ring 112 is attached on the containment structure 66 and extends between its side wall 88 and the top open end 80 of the reactor vessel 56 for providing lateral support of the reactor vessel top open end 80 so as to limit allowable lateral deflection of the vessel 56 while allowing free axial expansion to occur. This prevents imposition of lateral loads on the annular bellows 78 should a lateral seismic event occur.

The improved LMR 54 also has a generally cylindrical guard wall 114 disposed between the reactor and containment structure side walls 86,88. The guard wall 114 is connected at its lower end to the reactor vessel's structural support 72 adjacent the bottom end wall 82 so as to surround the vessel side wall 86 in an outwardly spaced relationship. Preferably, the vessel side wall 86 and the guard wall 114 have concentric cylindrical configurations and are separated by an approximately three inch wide annulus. The LMR 54 also includes a flat bottom liner 116 disposed between the base mat 90 of the containment structure 66 and the bottom end wall 82 of the reactor vessel 56 below the bed 74 of insulating material. This liner 116 has a cylindrical skirt at the periphery which is connected at its top end to the inside of the annular support ring 100.

Figure 4:
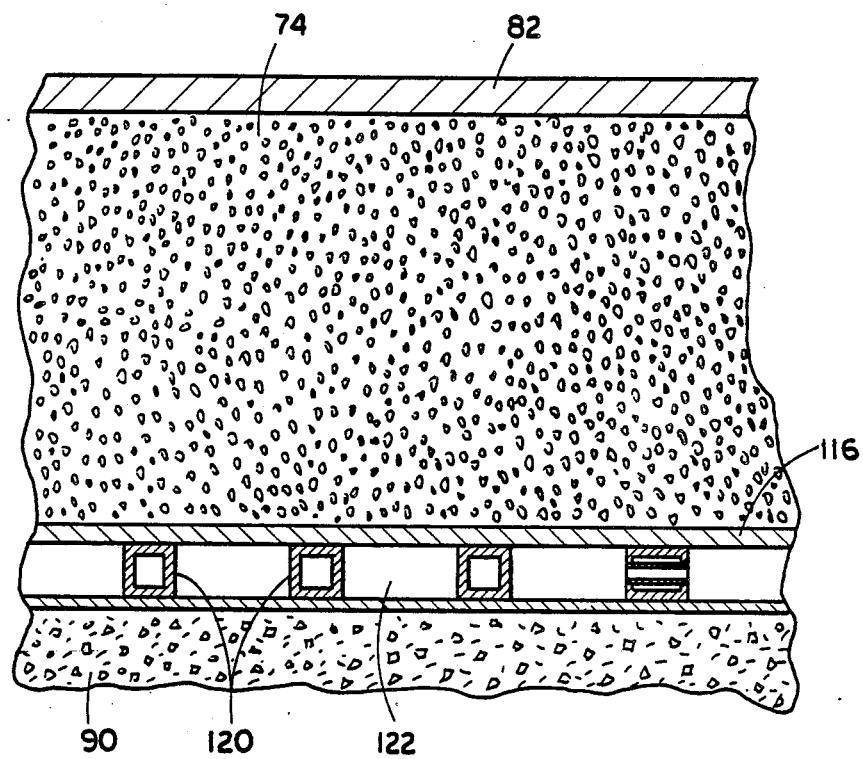
FIG. 4 is an enlarged cross-sectional view of an alternative to the design of the reactor vessel bottom shown in FIG. 2.

Finally, the LMR 54 can include cooling means 118 disposed in the base mat 90 of the containment structure 66 for removing heat from the containment structure and the bed 74 of insulating material. In a preferred form seen in FIG. 2, the cooling means 118 is a plurality of radial cooling pipes 119 embedded in the base mat 90 of the containment structure 66. In FIG. 4, an alternate arrangement is shown in which cooling tubes 120 are provided in a gas cavity 122 between the guard bottom liner 116 and the containment structure base mat 90. The cavity 122 would contain nitrogen gas, whereas, as in the case of the pipes 119, water would flow in the cooling tubes 120.

It will be readily understood that, in view of the bottom supported reactor vessel design incorporated by the improved LMR 54, when the axial growth of the vessel 56 due to thermal expansion occurs in the direction upward toward the deck 76, the deck supported control rods (not shown) insert further into the core 58 and provide and inherent decrease in reactivity. This is just the opposite of what occurs when the reactor vessel is suspended from the top deck and expands downward.

It is thought that the invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

I claim:

1. An improved liquid metal nuclear reactor construction comprising:
   (a) a nuclear reactor core having a bottom platform support structure;
   (b) a reactor vessel for holding a large pool of low pressure liquid metal coolant and housing said core within said pool, said vessel having an open top end, a closed bottom end wall and a continuous closed side wall interconnecting said top end and bottom end wall;
   (c) a containment structure surrounding said reactor vessel and having a sidewall spaced outwardly from said reactor vessel side wall and having a base mat spaced below said reactor vessel bottom end wall;
   (d) a central small diameter post anchored to said containment structure base mat and extending upwardly therefrom to said reactor vessel and upwardly therefrom to said reactor core so as to axially fix said bottom end wall of said reactor vessel and provide a center column support for said lower end of said reactor core;
   (e) annular support structure disposed in said reactor vessel on said bottom end wall thereof and extending about said lower end of said core
   (f) structural support means disposed between said containment structure base mat and bottom end of said reactor vessel wall and cooperating with said annular support structure and said central post for supporting said reactor vessel at its bottom end wall on said containment structure base mat so as to allow said reactor vessel to expand radially but substantially prevent any lateral motions that might be imposed by the occurrence of a seismic event;
   (g) a bed of insulating material disposed between said containment structure base mat and said bottom end wall of said reactor vessel and uniformly supporting said reactor vessel at its bottom end wall on said containment structure base mat so as to insulate said reactor vessel bottom end wall from said containment structure base mat and allow said reactor vessel bottom end wall to freely expand radially from said central post as it heats up while providing continuous support thereof;
   (h) a deck supported upon said said wall of said containment vessel above said top open end of said reactor vessel; and
   (i) extendible and retractable coupling means extending between said deck and said top open end of said reactor vessel and flexibly and sealably interconnecting said reactor vessel at its top end to said deck.

2. The improved reactor construction as recited in claim 1, further comprising:
   an annular guide ring axially positioned with radial keys and keyways disposed on said containment structure and extending between its side wall and said top open end of said reactor vessel for providing lateral support of said reactor vessel top open end for limiting imposition of lateral loads on said coupling means by the occurrence of a lateral seismic event while allowing axial expansion to occur.

3. The improved reactor construction as recited in claim 1, wherein said structural support means includes an annular support ring having a plurality of inward radially extending linear members being disposed between said containment structure base mat and said support ring of said reactor vessel and connected to and supporting said reactor vessel at its bottom end wall on said containment structure base mat.

4. The improved reactor construction as recited in claim 1, wherein said bed of insulating material is in sand-like granular form.

5. The improved reactor construction as recited in claim 4, wherein said insulating material is high density magnesium oxide particles.

6. The improved reactor construction as recited in claim 1, wherein said coupling means includes a plurality of serially connected extendible and retractable annular bellows.

7. The improved reactor construction as recited in claim 1, further comprising:
   a guard wall disposed between said reactor and containment structure side walls, said guard wall surrounding and spaced outwardly from said reactor vessel side wall and being connected at its lower end to said reactor vessel support ring adjacent the reactor vessel bottom end wall.

8. The improved reactor construction as recited in claim 1, further comprising:
a bottom liner disposed between said base mat of said containment structure and said bottom end wall of said reactor vessel and below said bed of insulating material.

9. The improved reactor construction as recited in claim 1, further comprising:
cooling means disposed in said base mat of said containment vessel for removing heat from said containment vessel and said bed of insulating material.

10. The improved reactor construction as recited in claim 9, wherein said cooling means includes a plurality of radial cooling pipes embedded in said base mat of said containment vessel and underlying said bed of insulating material.

11. An improved liquid metal nuclear reactor construction comprising:
(a) a nuclear reactor core having a bottom platform support structure;
(b) a generally cylindrical reactor vessel for holding a large pool of low pressure liquid metal coolant and housing said core within said pool, said vessel having an open top end, a closed flat bottom end wall with and a continuous cylindrical closed side wall interconnecting said top end and bottom end wall;
(c) a generally cylindrical concrete containment structure surrounding said reactor vessel and having a cylindrical side wall spaced outwardly from said reactor vessel side wall and having a flat base mat spaced below said reactor vessel bottom end wall;
(d) a central small diameter post anchored to said containment structure base mat and extending upwardly therefrom to said reactor vessel and upwardly therefrom to said reactor core so as to axially fix said bottom end wall of said reactor vessel and provide a center column support for said lower end of said reactor core;
(e) annular reinforced support structure disposed in said reactor vessel on said bottom end wall thereof and extending about said lower end of said core so as to support the periphery thereof while allowing radial expansion to occur
(f) an annular support ring having a plurality of inward radially extending linear members being disposed between said containment structure base mat and bottom end of said reactor vessel wall and connected to and supporting said reactor vessel at its bottom end wall on said containment structure base mat so as to allow said reactor vessel to expand radially but substantially prevent any lateral motions that might be imposed by the occurrence of a seismic event.
(g) a bed of insulating material in sand-like granular form disposed between said containment structure base mat and said bottom end wall of said reactor vessel and uniformly supporting said reactor vessel at its bottom end wall on said containment structure base mat so as to insulate said reactor vessel bottom end wall from said containment structure base mat and allow said reactor vessel bottom end wall to freely expand radially from said central post as it heats up while providing continuous support thereof;
(h) a deck supported upon said side wall of said containment structure above said top open end of said reactor vessel;
(i) a plurality of serially connected extendible and retractable annular bellows extending between said deck and said top open end of said reactor vessel and flexibility and sealably interconnecting said reactor vessel at its top end to said deck; and
(j) an annular guide ring with axially positioned radial keys and keyways disposed on said containment structure and extending between its side wall and said top open end of said reactor vessel for providing lateral support of said reactor vessel top opened by limiting imposition of lateral loads on said annular bellows by the occurrence of a lateral seismic event while allowing axial expansion to occur.

12. The improved reactor construction as recited in claim 11, further comprising:
a generally cylindrical guard wall disposed between said reactor and containment vessel side walls, said guard wall surrounding and spaced outwardly from said reactor vessel side wall and being connected at its lower end to said reactor vessel support structure adjacent the vessel bottom end wall.

13. The improved reactor construction as recited in claim 11, further comprising:
a flat bottom liner disposed between said base mat of said containment structure and said bottom end wall of said reactor vessel and below said bed of insulating material.

14. The improved reactor construction as recited in claim 11, further comprising:
cooling means disposed in said base mat of said containment structure for removing heat from said containment structure and said bed of insulating material.

15. The improved reactor construction as recited in claim 14, wherein said cooling means includes a plurality of radial cooling pipes embedded in said base mat of said containment structure and underlying said bed of insulating material.

16. The improved reactor construction as recited in claim 11, wherein said insulating material is high density magnesium oxide particles.

* * * * *